(12) United States Patent
Kikuchi et al.

(10) Patent No.: US 10,205,502 B2
(45) Date of Patent: Feb. 12, 2019

(54) AIRCRAFT-ANTENNA CONTROLLING DEVICE, AIRCRAFT, AIRCRAFT-ANTENNA SELECTING PROGRAM, AND AIRCRAFT-ANTENNA CONTROLLING METHOD

(71) Applicant: MITSUBISHI HEAVY INDUSTRIES, LTD., Tokyo (JP)

(72) Inventors: Shota Kikuchi, Tokyo (JP); Ippei Miyanishi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 458 days.

(21) Appl. No.: 14/417,643

(22) PCT Filed: Sep. 30, 2013

(86) PCT No.: PCT/JP2013/076528
§ 371 (c)(1),
(2) Date: Jan. 27, 2015

(87) PCT Pub. No.: WO2014/054575
PCT Pub. Date: Apr. 10, 2014

(65) Prior Publication Data
US 2015/0229376 A1     Aug. 13, 2015

(30) Foreign Application Priority Data

Oct. 1, 2012   (JP) .................................. 2012-219748

(51) Int. Cl.
*H01Q 1/28*     (2006.01)
*H01Q 3/24*     (2006.01)
(Continued)

(52) U.S. Cl.
CPC ............ *H04B 7/0608* (2013.01); *G01S 19/49* (2013.01); *H01Q 1/28* (2013.01); *H01Q 3/24* (2013.01); *H04B 7/0695* (2013.01); *H04B 7/088* (2013.01)

(58) Field of Classification Search
CPC ........ G01S 7/2813; G01S 1/02; G01S 13/106; G01S 19/36; G01S 7/36; G01S 19/15;
(Continued)

(56) References Cited

U.S. PATENT DOCUMENTS 2,598,064 A  *  5/1952  Lindenblad ............ H04B 7/185
                                                    343/705
3,004,153 A  *  10/1961 Alford ..................... H01Q 3/24
                                                    333/119
(Continued)

FOREIGN PATENT DOCUMENTS

EP       2869479 A4 *  7/2015  ............... H01Q 3/24
EP       2869479 A4 *  7/2015  ............... H01Q 3/24
(Continued)

OTHER PUBLICATIONS

Decision to Grant a Patent dated Aug. 9, 2016 in Japanese patent application No. 2012-219748.
(Continued)

*Primary Examiner* — Bernarr E Gregory
*Assistant Examiner* — Nuzhat Pervin
(74) *Attorney, Agent, or Firm* — Wenderoth, Lind & Ponack, L.L.P.

(57) ABSTRACT

A control unit of an aircraft includes a computer that predicts the current position of a wingman aircraft based on a temporal change in wingman-aircraft position information indicating the position of the wingman aircraft; an antenna selector that selects, from among multiple antennas, an antenna with which the elongation φt with respect to the
(Continued)

center axis of the antenna at the predicted current position of the wingman aircraft predicted by the computer falls within a coverage angle θ; and a beam controller that executes communication with the wingman aircraft via the antenna selected by the antenna selector. Thus, the control unit of the aircraft can select an optimal antenna for communication with the wingman aircraft from among the multiple antennas.

6 Claims, 7 Drawing Sheets

(51) Int. Cl.
  *H04B 7/06* (2006.01)
  *H04B 7/08* (2006.01)
  *G01S 19/49* (2010.01)
(58) Field of Classification Search
  CPC .. H01Q 3/2611; H01Q 3/2617; H01Q 3/2623; H01Q 21/29; H01Q 21/293; H01Q 3/24; H01Q 1/2291; H01Q 1/48; H01Q 1/3233; H01Q 1/28; H01Q 3/34; H04B 7/185; H04B 7/18506; H04B 7/18504; G91S 1/54; G08G 5/0013; H04W 40/246
  USPC ................................. 342/367, 433, 434, 876
  See application file for complete search history.

(56) References Cited

U.S. PATENT DOCUMENTS

| | | | | |
|---|---|---|---|---|
| 3,725,938 A * | 4/1973 | Black | ................. | G01S 1/02 342/434 |
| 3,858,206 A * | 12/1974 | Scheidler | ............. | G01S 13/106 342/157 |
| 3,922,685 A * | 11/1975 | Opas | ................. | H01Q 3/34 342/372 |
| 4,412,221 A * | 10/1983 | Stapleton | ................. | H01Q 3/24 343/705 |
| 4,617,569 A * | 10/1986 | Letoquart | ................. | G01S 1/54 342/412 |
| 5,313,221 A * | 5/1994 | Denton, Jr. | ............. | H01Q 1/48 343/846 |
| 6,275,187 B1 * | 8/2001 | Ross | ................. | H01Q 1/3233 342/175 |
| 6,323,813 B1 * | 11/2001 | Neat | ................. | H01Q 1/28 343/705 |
| 6,816,117 B2 * | 11/2004 | Fink | ................. | G01S 19/36 342/464 |
| 7,535,404 B2 * | 5/2009 | Corrigan | ............. | G08G 5/0013 340/947 |
| 8,509,140 B2 * | 8/2013 | Kauffman | .......... | H04B 7/18504 370/310 |
| 8,570,990 B2 * | 10/2013 | Kauffman | .......... | H04B 7/18506 370/338 |
| 8,676,192 B2 * | 3/2014 | Jalali | ................. | H01Q 1/2291 455/432.1 |
| 8,811,265 B2 * | 8/2014 | Horvath | ............. | H04B 7/18506 370/316 |
| 9,069,070 B2 * | 6/2015 | Savoy | ................. | G01S 19/15 |
| 9,264,126 B2 * | 2/2016 | Foster | ............... | H04B 7/18584 |
| 2009/0103473 A1 * | 4/2009 | Foster | ............... | H04B 7/18506 370/316 |
| 2015/0222350 A1 * | 8/2015 | Shi | ................. | H04B 7/18506 342/367 |

FOREIGN PATENT DOCUMENTS

| | | | | |
|---|---|---|---|---|
| JP | 3-220825 | 9/1991 | | |
| JP | 7-87011 | 3/1995 | | |
| JP | 2000-235070 | 8/2000 | | |
| JP | 2000235070 A | * 8/2000 | ............... | G01S 7/36 |
| JP | 2000235070 A | * 8/2000 | ............... | G01S 7/36 |
| JP | 3736112 | 1/2006 | | |
| JP | 2008-180636 | 8/2008 | | |

OTHER PUBLICATIONS

Decision to Grant a European Patent dated Oct. 13, 2016 in European patent application No. 13843511.0.
International Search Report dated Dec. 24, 2013 in International Application No. PCT/JP2013/076528.
Written Opinion of the International Searching Authority dated Dec. 24, 2013 in International Application No. PCT/JP2013/076528.
Extended European Search Report dated Jul. 1, 2015 in corresponding European patent application No. 13843511.0.

* cited by examiner

AIRCRAFT-ANTENNA CONTROLLING DEVICE, AIRCRAFT, AIRCRAFT-ANTENNA SELECTING PROGRAM, AND AIRCRAFT-ANTENNA CONTROLLING METHOD

TECHNICAL FIELD

The present invention relates to aircraft-antenna controlling devices, aircrafts, aircraft-antenna selecting programs, and aircraft-antenna controlling methods.

BACKGROUND ART

There are cases where aircrafts that are capable of shooting, searching for, and tracking targets shoot the targets being searched for and tracked.

As an example of this type of aircraft, Patent Literature 1 describes an aircraft that searches for, tracks, and shoots a target by way of the integrated use of an active target searching and tracking device and a passive target searching and tracking device that is capable of searching for and tracking a target without radiating electromagnetic waves.

CITATION LIST

Patent Literature (PTL 1) Publication of Japanese Patent No. 3736112

SUMMARY OF INVENTION

Technical Problem

In order to perform searching, tracking, etc. of a target more effectively, it is necessary to share various kinds of information between an aircraft and a wingman aircraft. However, since the positional relationship between the wingman aircraft and the aircraft changes with time, there are cases where the aircraft fails to establish communication with the wingman aircraft if it fails to select an antenna that is suitable for communication with the wingman aircraft.

The present invention has been made in view of this situation, and it is an object thereof to provide an aircraft-antenna controlling device, an aircraft, an aircraft-antenna selecting program, and an aircraft-antenna controlling method with which it is possible to select an antenna that is optimal for communication with a wingman aircraft from among multiple antennas.

Solution to Problem

In order to solve the problem described above, the aircraft-antenna controlling device, the aircraft, the aircraft-antenna selecting program, and the aircraft-antenna controlling method according to the present invention employ the following solutions.

An aircraft-antenna controlling device according to a first aspect of the present invention is an antenna controlling device for an aircraft having multiple antennas for communicating with a wingman aircraft, the multiple antennas being provided at different points on a fuselage, the aircraft-antenna controlling device including a wingman-aircraft-position predicting means for predicting the current position of the wingman aircraft based on a temporal change in position information indicating the position of the wingman aircraft; a selecting means for selecting, from among the multiple antennas, an antenna with which the elongation with respect to the center axis of the antenna at the current position of the wingman aircraft predicted by the wingman-aircraft-position predicting means fails within a coverage angle; and a communication controlling means for executing communication with the wingman aircraft via the antenna selected by the selecting means.

The aircraft-antenna controlling device according to this configuration is an aircraft-antenna controlling device having multiple antennas for communicating with a wingman aircraft, the multiple antennas being provided at different points on a fuselage. Since the aircraft and the wingman aircraft are moving relative to each other, there are cases where the aircraft tails to establish communication with the wingman aircraft if it fails to select an antenna that is suitable for communication with the wingman aircraft.

Thus, the current position of the wingman aircraft is predicted by the wingman-aircraft-position predicting means based on a temporal change in position information transmitted from the wingman aircraft and indicating the position of the wingman aircraft. As described earlier, the aircraft and the wingman aircraft are moving, so that even if wingman-aircraft position information is received, the position of the wingman aircraft indicated by the position information is a past position of the wingman aircraft. Thus, it is necessary to predict the current position of the wingman aircraft based on the wingman-aircraft position information.

Then, an antenna with which the elongation with respect to the central axis of the antenna at the predicted current position of the wingman aircraft fails within the coverage angle is selected from among the multiple antennas by the selecting means, and communication with the wingman aircraft is executed via the selected antenna by the communication controlling means. The antenna with which the elongation fails within the coverage angle is, in other words, an antenna with which it is possible to establish communication with the wingman aircraft.

Furthermore, the amount of change in the relative position of the aircraft and the wingman aircraft strongly depends on the change in the roll of the aircraft rather than the relative velocity of the aircraft and the wingman aircraft. Thus, considering the change in the relative position of the aircraft and the wingman aircraft due to the change in the roll of the aircraft, preferably, the antenna for executing communication with the wingman aircraft should be selected based on the elongation.

Accordingly, with this configuration, it is possible to select an antenna that is optimal for communication with the wingman aircraft from among the multiple antennas.

In the first aspect described above, preferably, the coverage angle of the antenna overlaps the coverage angle of an adjacent one of the other antennas, and, in the case where multiple antennas have been selected by the selecting means, one of the selected multiple antennas is selected based on the difference between the coverage angle and the elongation of each of the antennas.

With this configuration, since the coverage angle of an antenna overlaps the coverage angle of at least one of the other antennas, there are cases where multiple antennas are selected by the selecting means. In such cases, one of the selected multiple antennas is selected based on the difference between the coverage angle and the elongation of each of the antennas.

Accordingly, with this configuration, it is possible to select a more optimal antenna from among multiple antennas that allow communication with the wingman aircraft.

In the first aspect described above, preferably, one antenna is selected from among the antenna with the greatest difference between the coverage angle and the elongation, the antennas with which the difference is greater than or equal to a predetermined constant, and the antennas with which the difference is greater compared with the last communication.

The antenna with the greatest difference between the coverage angle and the elongation is an antenna with the greatest tolerance for communication with the wingman aircraft. Furthermore, the antennas with which the difference is greater than or equal to the predetermined constant ace antennas with which it is possible to perform communication with the wingman aircraft more reliably. Furthermore, the antennas with which the difference is greater compared with the last communication are antennas with which the communication conditions with the wingman aircraft are better compared with the last communication.

With this configuration, it is possible to select a more optimal antenna by selecting one antenna from among the antennas described above.

In the first aspect described above, preferably, the antenna with the greatest difference between the center axis and the elongation, the antennas with which the difference is greater than or equal to the constant, and the antennas with which the difference is greater compared with the last communication are weighted individually by predetermined values, and the antenna with the greatest total value of the results is selected.

With this configuration, the difference between the center axis and the elongation of each of the antennas is evaluated comprehensively, and the antenna with the least elongation is selected, so that it is possible to select a more optimal antenna.

An aircraft according to a second aspect of the present invention includes multiple antennas for communicating with a wingman aircraft, the multiple antennas being provided at different points on a fuselage; and the antenna controlling device described above.

An aircraft-antenna selecting program according to a third aspect of the present invention is an antenna selecting program for an aircraft having multiple antennas for communicating with a wingman aircraft, the multiple antennas being provided at different points on a fuselage, wherein the aircraft-antenna selecting program causes a computer to function as a selecting means for selecting, from among the multiple antennas, an antenna with which the elongation with respect to the center axis of the antenna at the current position of the wingman aircraft predicted based on a temporal change in position information indicating the position of the wingman aircraft falls within a coverage angle.

An aircraft-antenna controlling method according to a fourth aspect of the present invention is an antenna controlling method for an aircraft having multiple antennas for communicating with a wingman aircraft, the multiple antennas being provided at different points on a fuselage, the aircraft-antenna controlling method including a first step of predicting the current position of the wingman aircraft based on a temporal change in position information indicating the position of the wingman aircraft; a second step of selecting, from among the multiple antennas, an antenna with which the elongation with respect to the center axis of the antenna at the predicted current position of the wingman aircraft falls within a coverage angle; and a third step of executing communication with the wingman aircraft via the selected antenna.

Advantageous Effects of Invention

According to the present invention, a superior advantage is afforded in that it is possible to select an antenna that is optimal for communication with a wingman aircraft from among multiple antennas.

DESCRIPTION OF EMBODIMENT

Now, an embodiment of an aircraft-antenna controlling device, an aircraft, an aircraft-antenna selecting program, and an aircraft-antenna controlling method according to the present invention will be described with reference to the drawings.

Figure 1:
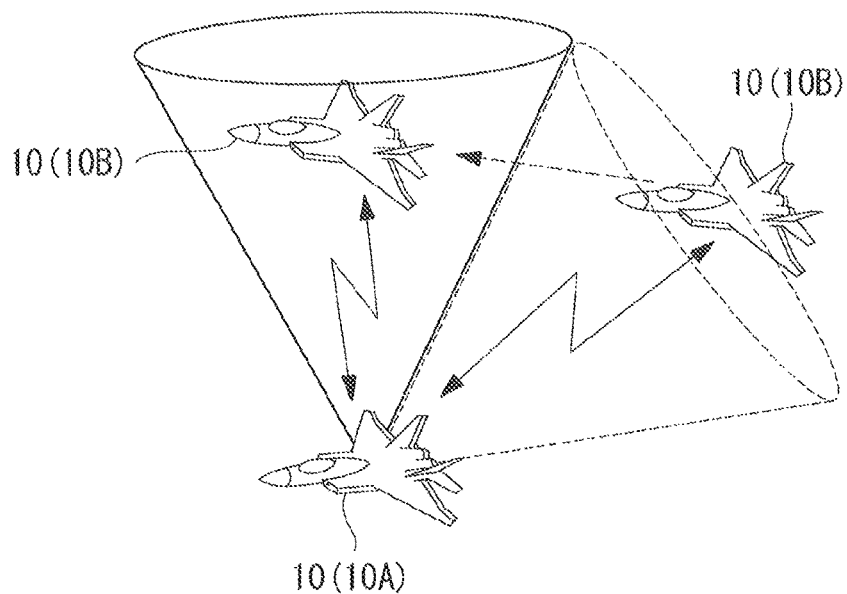
FIG. 1 is a schematic illustration showing the relationship between an aircraft and a wingman aircraft according to an embodiment of the present invention.

FIG. 1 is a schematic diagram showing the relationship between an aircraft 10A and a wingman aircraft 10B, which are aircrafts 10 according to this embodiment.

On the aircraft 10 according to this embodiment, multiple antennas 12 (also see FIG. 3) for communicating with the wingman aircraft 10B are installed at different points on the fuselage. The aircraft 10A and the wingman aircraft 10B communicate with each other while changing their positions as they fly. The aircrafts 10 according to this embodiment are configured such that the multiple antennas 12 allow communication between the aircraft 10A and the wingman aircraft 10B regardless of the direction in which the wingman aircraft 10B is located.

Figure 2:
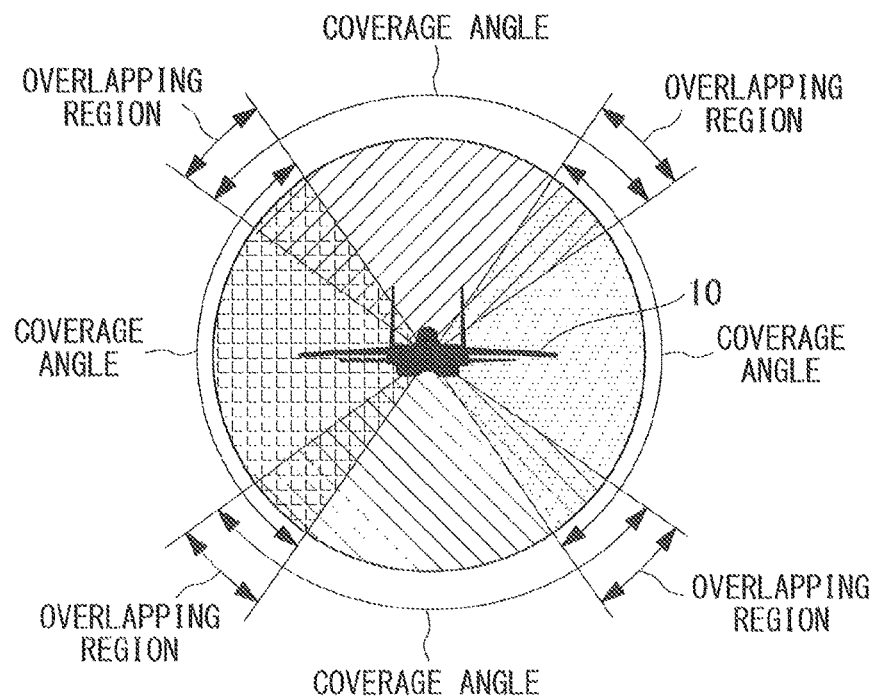
FIG. 2 is a schematic illustration showing the coverage angles of antennas according to the embodiment of the present invention.

FIG. 2 is a schematic diagram showing the coverage angles of the antennas 12 of the aircraft 10. As an example, the aircraft 10 shown in FIG. 2 covers the upward, downward, leftward, and rightward directions with four antennas 12. A region in which the coverage angle of each antenna 12 overlaps the coverage angle of an adjacent antenna 12 is called an overlapping region.

Here, since the aircraft 10A and the wingman aircraft 10B are moving relative to each other, in order to ensure reliable communication between the aircraft 10A and the wingman aircraft 10B, the aircraft 10A has to ascertain the current positional relationship between the aircraft 10A and the wingman aircraft 10B and execute processing for selecting and switching to a suitable antenna 12 among the multiple antennas 12 as needed (antenna handover).

Figure 3:
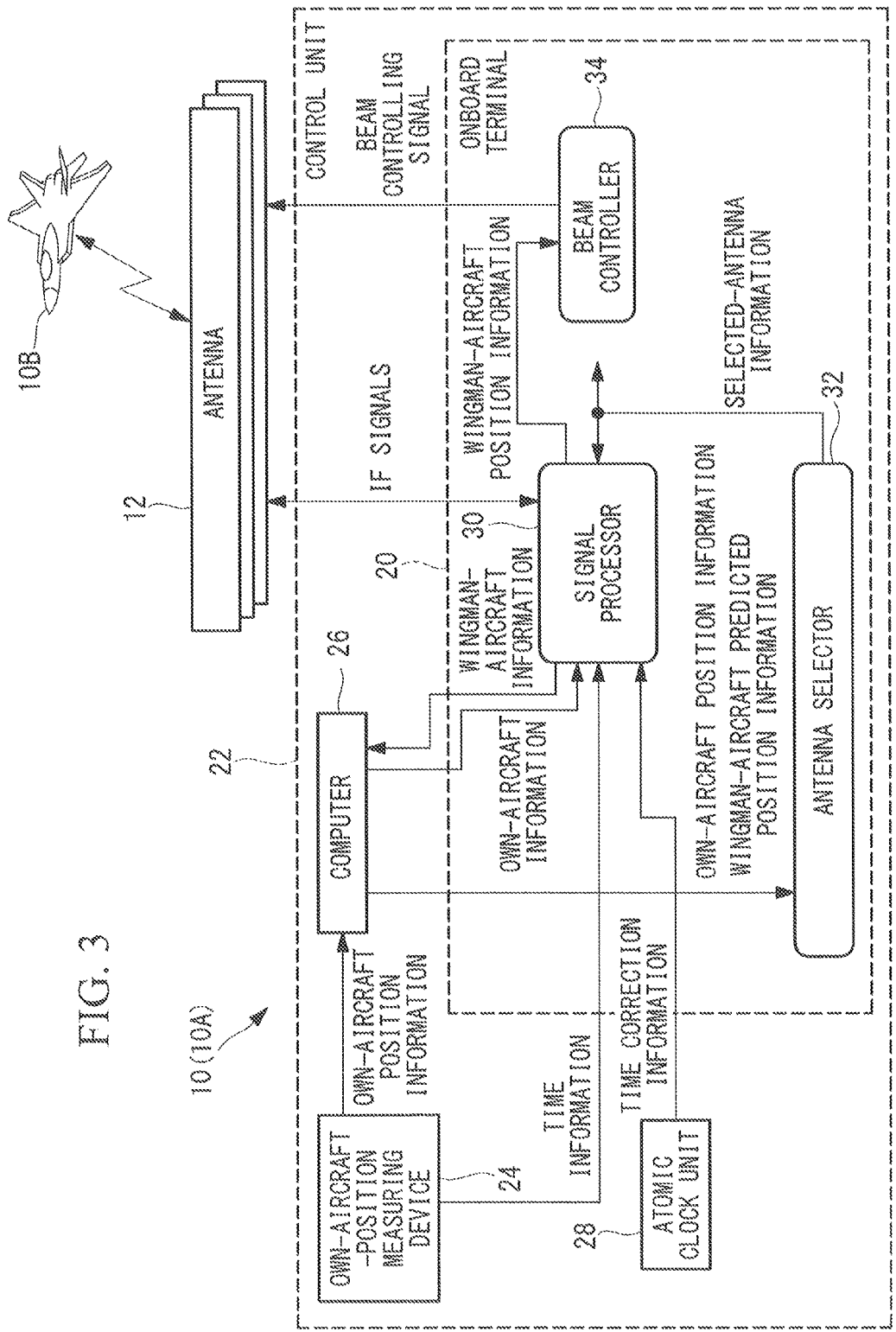
FIG. 3 is a block diagram showing the configuration of an antenna controlling device according to the embodiment of the present invention.

FIG. 3 is a block diagram showing the construction of an onboard terminal 20 of the aircraft 10. The onboard terminal 20 is an antenna controlling device that controls the antennas 12 of the aircraft 10A to establish communication between the aircraft 10A and the wingman aircraft 103 and is provided in a control unit 22 of the aircraft 10. FIG. 3 mainly shows the functions of the control unit 22 related to the onboard terminal 20.

The control unit 22 includes an own-aircraft-position measuring device 24, a computer 26, and an atomic clock unit 28 in addition to the onboard terminal 20. The onboard terminal 20 and the computer 26 are constituted of, for example, a CPU (Central Processing Unit), a RAM (Random Access Memory), a computer-readable recording medium, etc. Furthermore, for example, the series of processes for realizing various functions that, will be described later are recorded on a recording medium, etc. in the form of programs, and the various functions are realized by the CPU loading the programs into the RAM, etc. and processing information and executing calculations.

The own-aircraft-position measuring device 24 is, for example, a GPS (Global Positioning System) or INS (Inertial Navigation System) device, and it obtains own-aircraft position information indicating the position of the aircraft 10A itself. The own-aircraft position information is associated with the time when the aircraft 10A obtained the own-aircraft position information.

The computer 26 executes various calculations needed for the flight of the aircraft 10A.

The atomic clock unit 28 outputs information (hereinafter referred to as "time correction information") for correcting the time that is used for the various calculations executed in the aircraft 10A for the purpose of time synchronization between the aircraft 10A and the wingman aircraft 10B.

The onboard terminal 20 includes a signal processor 30, an antenna selector 32, and a beam controller 34.

The signal processor 30 executes signal processing on various information that is transferred to and from the wingman aircraft 10B via the antennas 12.

The antenna selector 32 executes antenna selection processing for selecting one antenna 12 for communicating with the wingman aircraft 10B from among the multiple antennas 12.

The beam controller 34 controls a beam based on input wingman-aircraft position information so that the antenna 12 selected by the antenna selector 32 performs communication with the wingman aircraft 10.

Next, the various processes executed by the control unit 22 will be described in detail.

The antenna 12 receives wingman-aircraft information from the wingman aircraft 10B and outputs it to the signal processor 30 in the form of IF (Intermediate Frequency) signals. The wingman-aircraft information includes wingman-aircraft position information, and information indicating the status of the wingman aircraft 10B (hereinafter referred to as "fuselage information") and is associated with the time when the wingman aircraft 10B obtained the wingman-aircraft information.

The signal processor 30 executes IF signal processing and modulation/demodulation processing on the IF signals input from the antenna 12, generating digital signals. Furthermore, since the digital signals are encrypted, the signal processor 30 executes encoding processing on the digital signals to restore the wingman-aircraft information. Then, the signal processor 30 outputs the wingman-aircraft information to the computer 26 and outputs the wingman-aircraft position information included in the wingman-aircraft information to the beam controller 34. The wingman-aircraft position information is expressed in the form of three-dimensional coordinates $P_{(t)}$, $(X_{(t)}, Y_{(t)}, Z_{(t)})$ at time t when the wingman-aircraft position information was obtained.

The computer 26 predicts the current positron of the wingman aircraft 10B based on a temporal change in the wingman-aircraft position information included in the wingman-aircraft information input from the signal processor 30 and outputs the prediction result (hereinafter referred to as "predicted current position") as wingman-aircraft predicted position information.

Examples of the method of predicting the current position of the wingman aircraft 10B include a velocity predicting method, an acceleration predicting method, and a circular-path predicting method.

Figure 4:
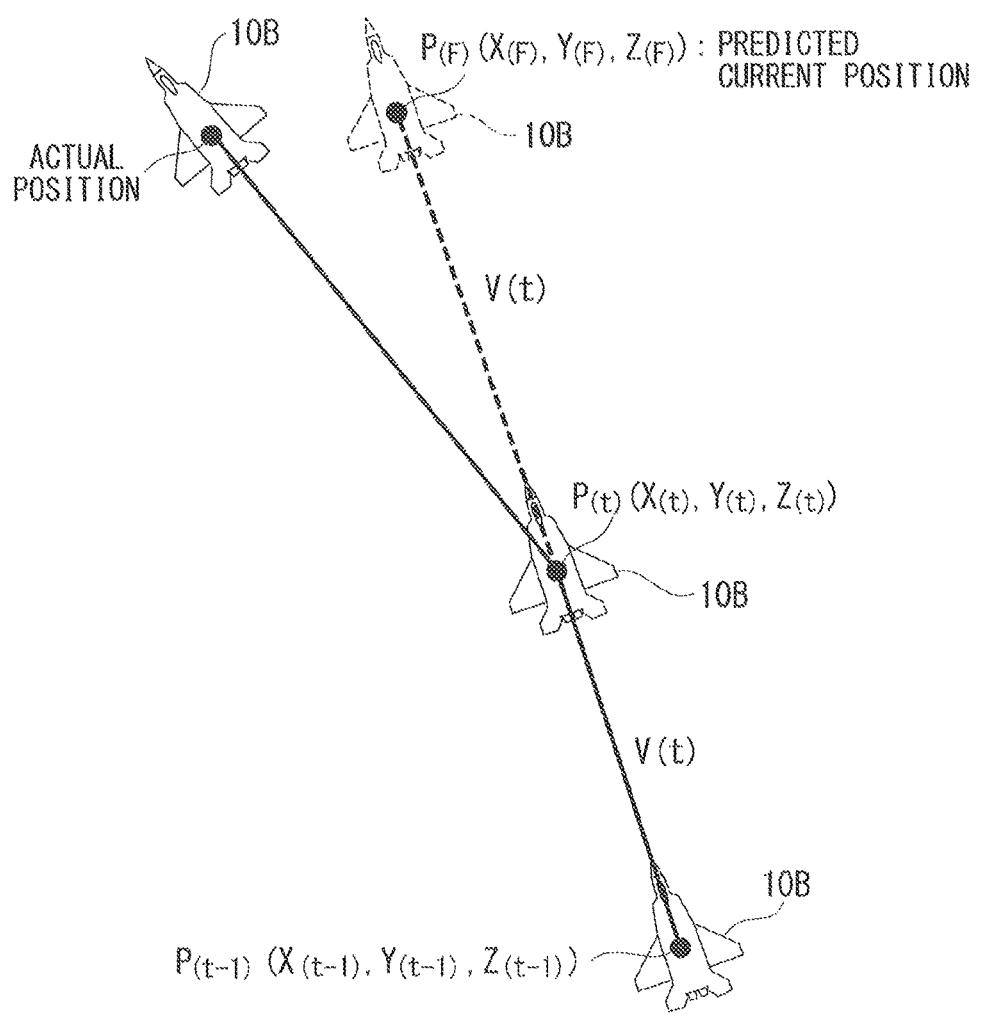
FIG. 4 is a schematic illustration showing a velocity predicting method according to the embodiment of the present invention.

In the velocity predicting method, as shown in FIG. 4, assuming that the wingman aircraft 10B is moving in a straight line at a constant velocity, the current position of the wingman aircraft 10B is predicted by calculating the velocity V(t) of the wingman aircraft 10B based on a temporal change in the wingman-aircraft position information.

Figure 5:
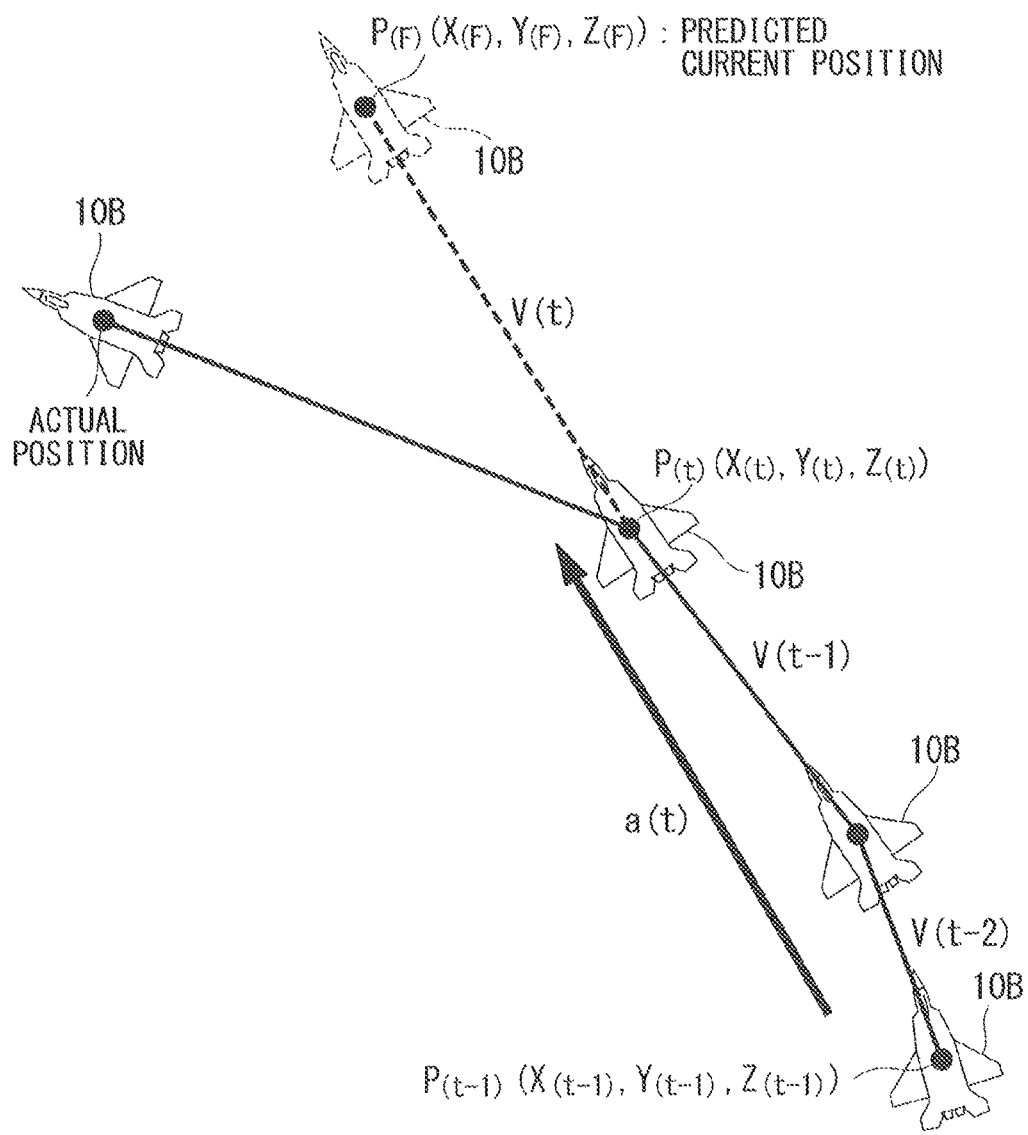
FIG. 5 is a schematic illustration showing an acceleration predicting method according to the embodiment of the present invention.

In the acceleration predicting method, as shown in FIG. 5, assuming that the wingman aircraft 10B is moving in a straight line at a constant acceleration, the current position of the wingman aircraft 10B is predicted by calculating the acceleration a(t) of the wingman aircraft 10B based on a temporal change in the wingman-aircraft position information.

Figure 6:
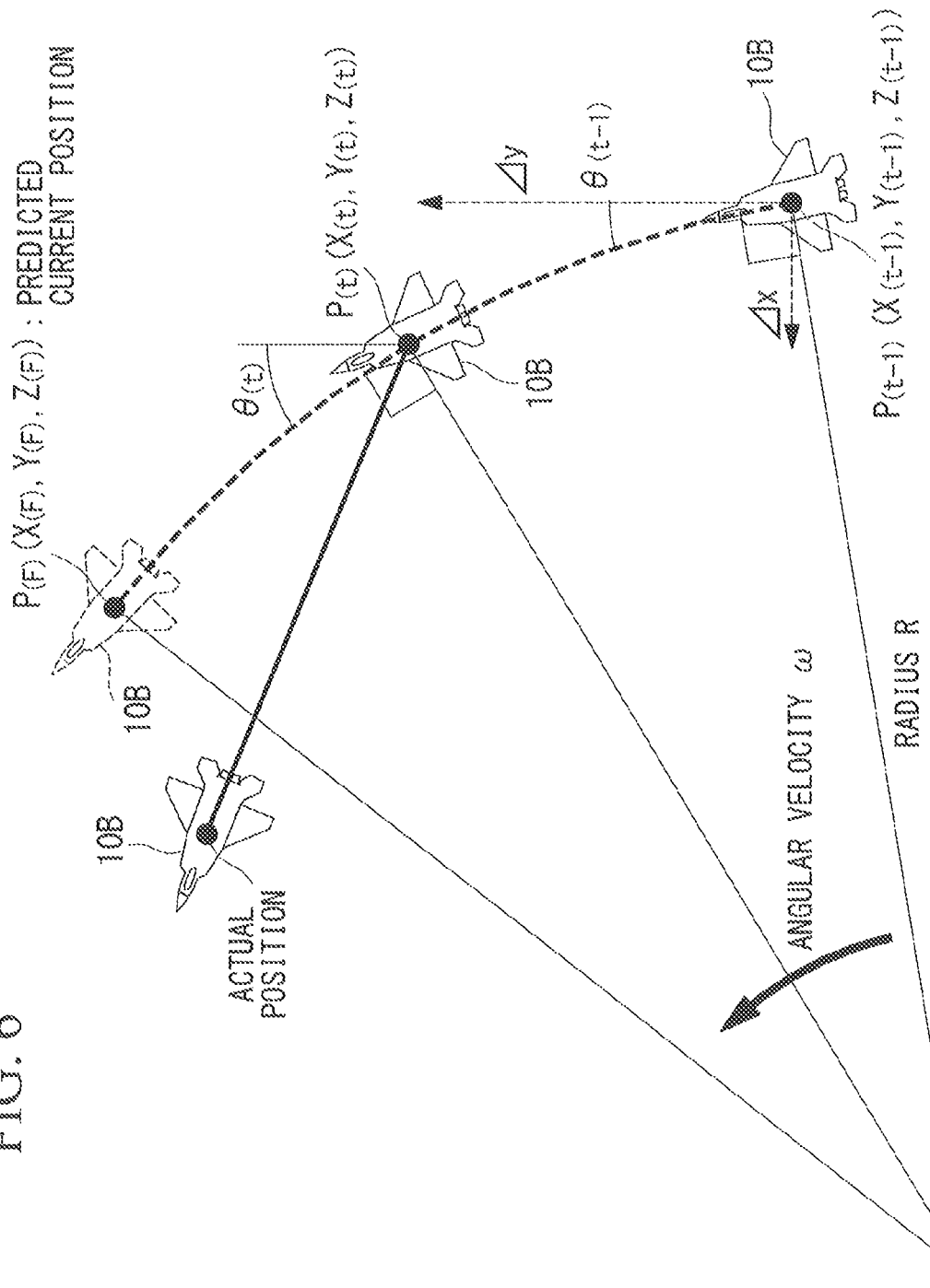
FIG. 6 is a schematic illustration showing a circular-path predicting method according to the embodiment of the present invention.

In the circular-path predicting method, as shown in FIG. 6, assuming that the wingman aircraft 10B is moving in a circular path, the current position of the wingman aircraft 10B is predicted by calculating the center of the circular path, the angular velocity $\omega$, and the revolving radius R based on a temporal change in the wingman-aircraft position information.

Of the velocity predicting method, the acceleration predicting method, and the circular-path predicting method, it is preferable to predict the current position of the wingman aircraft 10B by using the velocity predicting method since the predicted current position of the wingman aircraft 10B obtained by using the velocity predicting method is more approximate to the actual position (real position) compared with the other methods.

The computer 26 outputs the wingman-aircraft predicted position information to the antenna selector 32 together with the own-aircraft position information input from the own-aircraft-position measuring device 24.

It is to be noted that the amount of change in the relative position of the aircraft 10A and the wingman aircraft 10B strongly depends on the change in the roll of the aircraft 10A rather than the relative velocity of the aircraft 10A and the wingman aircraft 10B.

Figure 7:
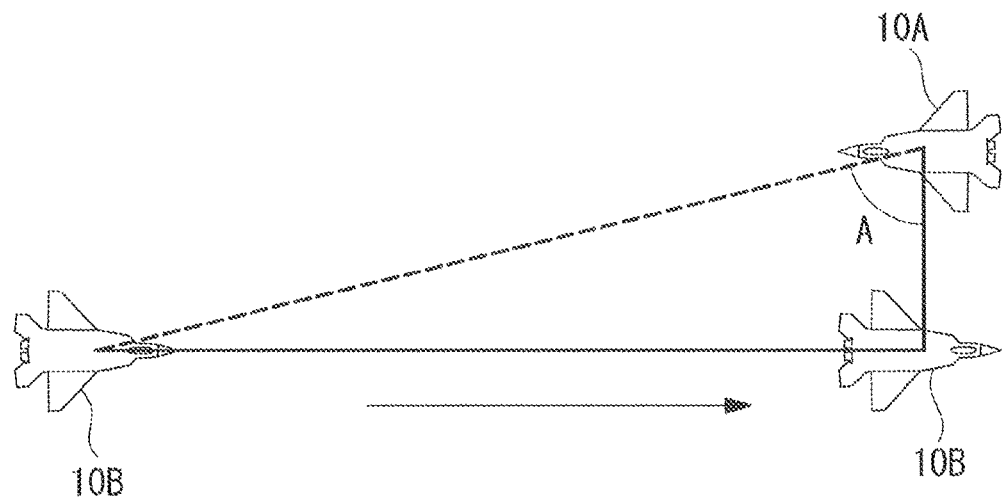
FIG. 7 is a schematic illustration showing the relative position of the aircraft and the wingman aircraft according to the embodiment of the present invention.

That is, as shown in FIG. 7, the maximum roll rate (deg/S) of the aircraft 10A is higher compared with the angle A (deg/S) representing the amount of change in the relative position in the case where the aircraft 10A and the wingman aircraft 10B pass by each other at high speed. Therefore, the amount of change in the relative position of the aircraft 10A and the wingman aircraft 103 is large.

Thus, the antenna selector 32 selects an antenna 12 with which the elongation with respect to the center axis of the antenna 12 at the predicted current position of the wingman aircraft 10B falls within the coverage angle from among the multiple antennas 12 (antenna selection processing).

Figure 8:
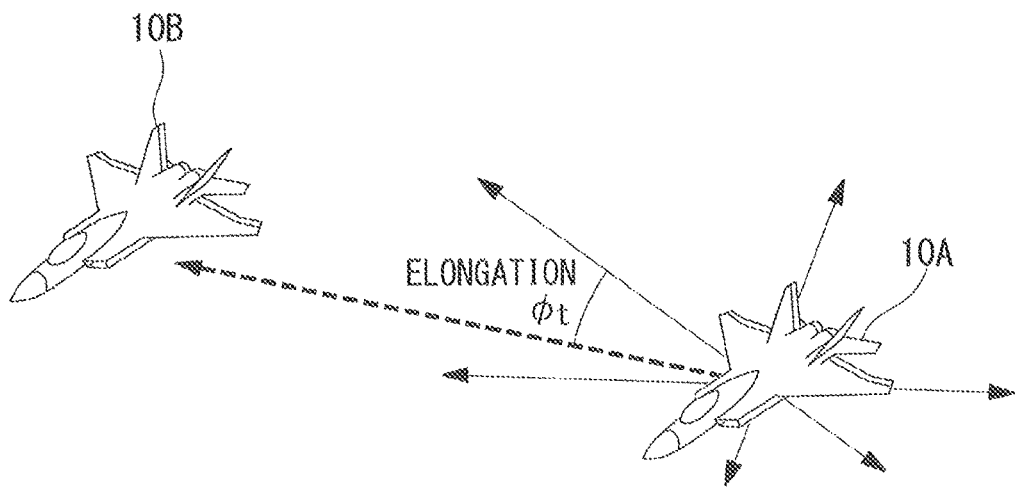
FIG. 8 is a schematic illustration showing an elongation according to the embodiment of the present invention.

To describe the elongation more specifically with reference to FIG. 8, the elongation $\varphi_t$ is the angle formed by the straight line connecting the center position of the antenna 12 and the predicted current position (the broken line in FIG. 8) and the line of the center axis of the antenna 12 (the solid line in FIG. 8).

Figure 9:
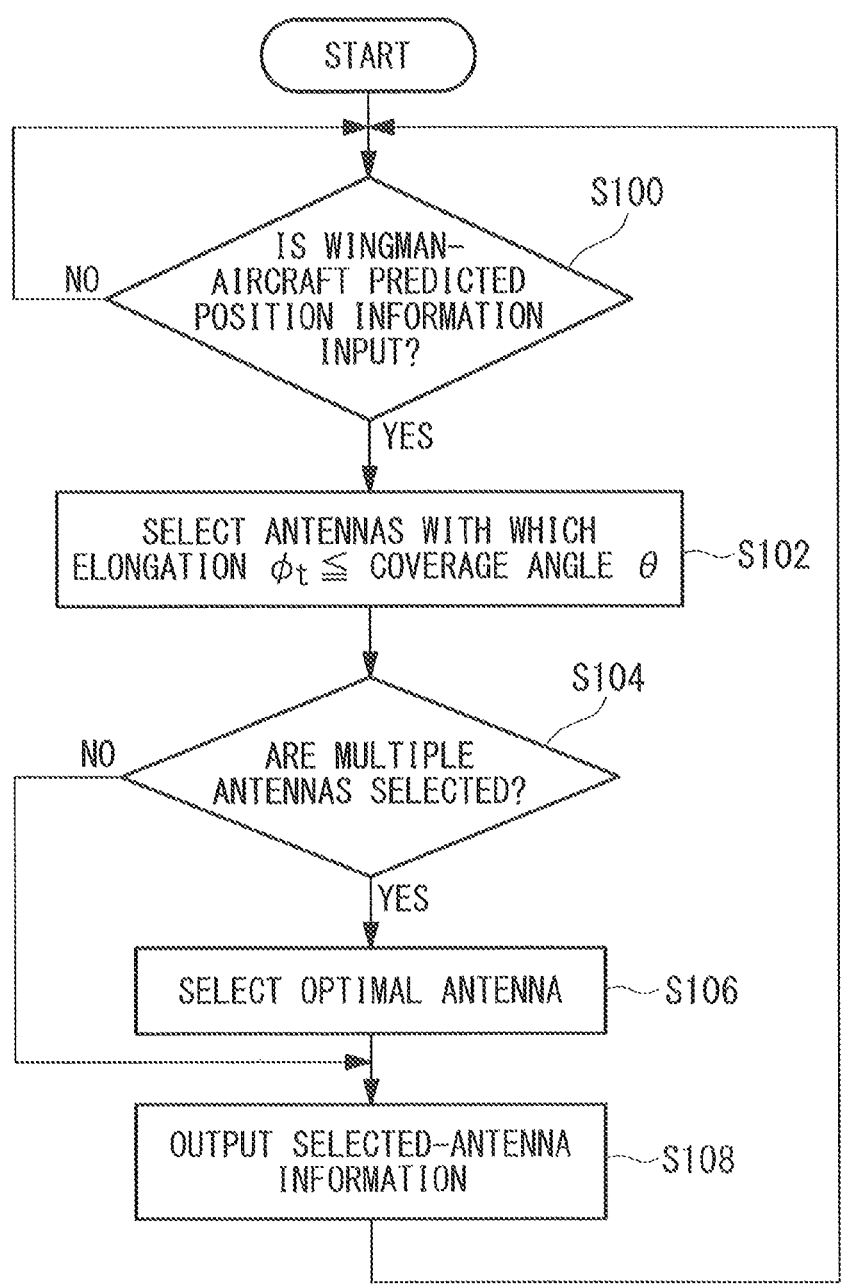
FIG. 9 is a flowchart showing the flow of antenna selection processing according to the embodiment of the present invention.

FIG. 9 is a flowchart (antenna selecting program) showing the procedure of the antenna selection processing executed by the antenna selector 32. The antenna selecting program is stored in advance in a predetermined area of a storage means (e.g., a ROM) provided in the onboard terminal 20. The antenna selection processing is executed when the aircraft 10A performs communication with the wingman aircraft 10B.

First, in step 100, a waiting state continues until wingman-aircraft predicted position information is input. When wingman-aircraft predicted position information is input, the procedure proceeds to step 102.

In step 102, an antenna 12 with which the elongation $\varphi_t$ with respect to the center axis of the antenna 12 at the predicted, current position of the wingman aircraft 10B falls within the coverage angle θ is selected. The coverage angle θ of each antenna 12 is stored in advance.

The antenna 12 with which the elongation $\varphi_t$ falls within the coverage angle θ is an antenna 12 with which it is possible to establish communication with the wingman aircraft 10B. Furthermore, considering changes in the relative position of the aircraft 10A and the wingman aircraft 10B due to changes in the roll of the aircraft 10A, it is preferable to select an antenna 12 for executing communication with the wingman aircraft 10B with reference to the elongation $\varphi_t$ of the current position of the wingman aircraft 10B and the center axis of the antenna 12.

Next, in step 104, it is determined whether multiple antennas 12 have been selected in step 102. The procedure proceeds to step 106 in the case where the result is yes, whereas the procedure proceeds to step 108 in the case where the result is no. Since the coverage angle θ of each antenna 12 of the aircraft 10 according to this embodiment overlaps the coverage angle θ of at least one other antenna 12 as shown in FIG. 2, there are cases where multiple antennas 12 are selected in step 102.

In step 306, an antenna 12 that is optimal for communication with the wingman aircraft 10B is selected from among the multiple antennas 12 selected in step 102. In this step 106, one optimal antenna 12 is selected based on the difference between the coverage angle θ and the elongation $\varphi_t$ of each of the selected multiple antennas 12.

In this step 106, in order to select an optimal antenna 12, an antenna 12 with which the difference between the coverage angle θ and the elongation $\varphi_t$ (θ−$\varphi_t$, hereinafter referred to as the "coverage-angle margin") is the greatest (a first factor), antennas 12 with which the coverage-angle margin is greater than or equal to a predetermined constant k (θ−$\varphi_t$≥k) (a second factor), and antennas 12 with which the coverage-angle margin is greater compared with the last communication (the last time the antenna 12 was selected) (θ−$\varphi_t$≥θ−$\varphi_{t-1}$) (a third factor) are extracted. The constant k is determined in advance based on, for example, the time needed for communication with the wingman aircraft 10B, the maximum roll rate of the aircraft 10A, and the ratio of the overlapping region to the coverage angle.

The antenna 12 with the greatest coverage-angle margin is an antenna with the greatest tolerance for communication with the wingman aircraft 10B. Furthermore, the antennas 12 with which the coverage-angle margin is greater than or equal to the predetermined constant k are antennas 12 with which it is possible to perform communication with the wingman aircraft 10B more reliably. Furthermore, the antennas 12 with which the coverage-angle margin is greater compared with the last communication are antennas 12 with which the communication conditions with the wingman aircraft 10B are better compared with the last communication.

Then, in step 106, the antenna 12 satisfying the first factor is weighted by a first predetermined value, the antennas 12 satisfying the second factor are weighted by a second predetermined value, the antennas 12 satisfying the third factor are weighted by a third predetermined value, and the antenna 12 with the greatest total value is selected as an optimal antenna 12. Thus, in the antenna selection processing, the antenna 12 with the least elongation $\varphi_t$ is selected by comprehensively evaluating the coverage-angle margin of each of the antennas 12, which makes it possible to select a more optimal antenna 12.

For example, the order of the values of the weights from larger to smaller is the first predetermined value, the second predetermined value, and the third predetermined value.

Then, in step 108, selected-antenna information indicating the selected antenna 12 is output to the signal processor 30 and the beam controller 34.

When the selected-antenna information is input, the signal processor 30 outputs IF signals obtained by converting the own-aircraft information to the antenna 12 indicated by the selected-antenna information.

The own-aircraft information is information including the fuselage information and own-aircraft position information of the aircraft 10A, and it is output from the computer 26 to the signal processor 30. The signal processor 30 obtains the accurate time of acquisition of the own-aircraft information by correcting the time information input from the own-aircraft-position measuring device 24 according to the time correction information input from the atomic clock unit 28 and executes encoding processing, modulation/demodulation processing, and IF signal processing on the own-aircraft information to convert it into IF signals.

When the selected-antenna information is input, the beam controller 34 generates a beam controlling signal and outputs it to the selected antenna 12 such that the selected antenna 12 radiates a beam in the direction where the wingman aircraft 10B is located. The position of the wingman aircraft 10B to which the beam is to be radiated is the position of the wingman aircraft 10B indicated by the input wingman-aircraft position information. The beam controller 34 calculates the direction in which the wingman aircraft 10B is located based on the position of the wingman aircraft 10B and the position of the aircraft 10A.

Through the processing described above, the own-aircraft information is transmitted to the wingman aircraft 10B via the antenna 12 selected through the antenna selection processing.

The antenna selection processing returns to step 100 when the processing in step 108 is finished, and the processing from step 100 to step 108 is repeated during communication with the wingman aircraft 10B. The control unit 22 according to this embodiment can track the wingman aircraft 10B at high speed by executing the processing from step 100 to step 108 at high speed.

In the case where communication is performed with multiple wingman aircrafts 10B, the control unit 22 executes the antenna selection processing for each of the wingman aircrafts 10B with which communication is to be performed and performs communication while shifting the timing for each of the wingman aircrafts 103.

As described above, the control unit 22 of the aircraft 10 according to this embodiment includes the computer 26 that predicts the current position of the wingman aircraft 10B based on a temporal change in the wingman-aircraft position information indicating the position of the wingman aircraft 10B, the antenna selector 32 that selects, from among the multiple antennas 12, an antenna 12 with which the elongation $\varphi_f$ with respect to the center axis of the antenna 12 at the predicted current position of the wingman aircraft 10B predicted by the computer 26 falls within the coverage angle θ, and the beam controller 34 that executes communication with the wingman aircraft 10B via the antenna 12 selected by the antenna selector 32.

Thus, the control unit 22 of the aircraft 10 can select an optimal antenna 12 for communication with the wingman aircraft 10B from among the multiple antennas 12.

Although the present invention has been described above in the context of the above-described embodiment, the technical scope of the present invention is not limited to the scope of the above-described embodiment. It is possible to modify or improve the above-described embodiment in various ways without departing from the spirit of the invention, and embodiments involving the modifications or improvements are also encompassed within the technical scope of the present invention.

For example, although an optimal antenna 12 is selected by using the first factor, the second factor, and the third factor in the case where multiple antennas 12 have been selected through the antenna selection processing in the above-described embodiment, the present invention is not limited to this embodiment. An optimal antenna 12 may be selected by using other factors without limitation to the first factor, the second factor, and the third factor, or an optimal antenna 12 may be selected by using one or two of the first factor, the second factor, and the third factor.

Furthermore, although the position of the wingman aircraft 10B to which a beam is to be radiated is the position of the wingman aircraft 10B indicated by the wingman-aircraft position information input to the beam controller 34 in the above-described embodiment, the present invention is not limited to this embodiment. Alternatively, wingman-aircraft predicted position information may be input to the beam controller 34 so that the position of the wingman aircraft 10B to which a beam is to be radiated becomes the predicted current position of the wingman aircraft 10B indicated by the wingman-aircraft predicted position information input to the beam controller 34.

Furthermore, the flow of the antenna selection processing (antenna selecting program) in the above-described embodiment is also just an example, and unnecessary steps may be removed, new steps may be added, and the order of processing may be changed without departing from the spirit of the present invention.

REFERENCE SIGNS LIST

10 Aircrafts
10A Aircraft
10B Wingman aircraft
12 Antennas
20 Onboard terminal
32 Antenna selector
34 Beam controller

The invention claimed is:

1. An aircraft-antenna controlling device for an aircraft having multiple antennas for communicating with a wingman aircraft in flight, the multiple antennas being provided at different points on a fuselage, the aircraft-antenna controlling device comprising:
   a wingman-aircraft-position predicting part for predicting a predicted current position of the wingman aircraft based on a temporal change in position information indicating a position of the wingman aircraft in flight;
   a selecting part for selecting, from among the multiple antennas, an antenna with which elongation with respect to a center axis of the respective antenna at the predicted current position of the wingman aircraft predicted by the wingman-aircraft-position predicting part falls within a coverage angle; and
   a communication controlling means for executing communication with the wingman aircraft via the antenna selected by the selecting part,
   wherein, in a case where the predicted current position of the wingman aircraft falls within a respective coverage angle of more than one antenna from among the multiple antennas, the antenna from among the more than one antenna is further selected based on a difference between a center axis of the respective coverage angle and the elongation of each of the more than one antenna.

2. An aircraft-antenna controlling device according to claim 1,
   wherein the coverage angle of the selected antenna overlaps the coverage angle of an adjacent one of the remaining ones of the multiple antenna.

3. An aircraft-antenna controlling device according to claim 2, wherein the antenna is further selected from among:
   the antenna from among the more than one antenna to have a greatest difference between a center axis and the elongation,
   the antenna from among the more than one antenna to have a difference between the center axis and the elongation that is greater than or equal to a predetermined constant, and
   the antennas from among the more than one antenna to have a difference between the center axis and the elongation that is greater as compared with a previous difference between the center axis and the elongation of a last communication.

4. An aircraft-antenna controlling device according to claim 3, wherein the selecting means further selects from among the antenna from among the more than one antenna to have a greatest difference between the center axis and the elongation, the antenna from among the more than one antenna to have a difference between the center axis and the elongation that is greater than or equal to the predetermined constant, and the antenna from among the more than one antenna to have a difference between the center axis and the elongation that is greater as compared with the previous different between the center axis and the elongation of the last communication, based on a greatest total value resulting from individually weighting each by predetermined values.

5. An antenna controlling method for an aircraft having multiple antennas for communicating with a wingman aircraft in flight, the multiple antennas being provided at different points on a fuselage, the aircraft-antenna controlling method comprising:
   a first step of predicting a predicted current position of the wingman aircraft based on a temporal change in position information indicating a position of the wingman aircraft in flight;

a second step of selecting, from among the multiple antennas, a selected antenna with which an elongation with respect to a center axis of the respective antenna at the predicted current position of the wingman aircraft falls within a coverage angle of the respective antenna; and a third step of executing communication with the wingman aircraft via the selected antenna.

6. A non-transient computer readable medium containing program instructions for causing a computer to controlling multiple antennas provided at different points on a fuselage of an aircraft, comprising:

predicting, a predicted current position of the wingman aircraft based on a temporal change in position information indicating a position of the wingman aircraft in flight;

selecting, from among the multiple antennas, a selected antenna with which an elongation with respect to a center axis of the respective antenna at the predicted current position of the wingman aircraft falls within a coverage angle of the respective antenna; and executing communication with the wingman aircraft via the selected antenna.

* * * * *